(12) United States Patent
Blossfeld

(10) Patent No.: US 7,516,653 B2
(45) Date of Patent: Apr. 14, 2009

(54) TIRE PRESSURE MONITORING APPARATUS

(75) Inventor: Mike Blossfeld, South Lyon, MI (US)

(73) Assignees: TRW Automotive U.S. LLC, Farmington Hills, MI (US); Societe de Technologies Michelin, Clemont-Ferrand (FR)

( * ) Notice: Subject to any disclaimer, the term of this patent is extended or adjusted under 35 U.S.C. 154(b) by 0 days.

(21) Appl. No.: 11/593,423

(22) Filed: Nov. 6, 2006

(65) Prior Publication Data

US 2007/0113637 A1 May 24, 2007

Related U.S. Application Data

(60) Provisional application No. 60/734,664, filed on Nov. 8, 2005.

(51) Int. Cl.
*B60C 23/02* (2006.01)

(52) U.S. Cl. ..................................... 73/146.8

(58) Field of Classification Search ............ 73/146, 73/146.8, 146.5; 301/37.21; 340/445, 442, 340/443
See application file for complete search history.

(56) References Cited

U.S. PATENT DOCUMENTS

| | | | |
|---|---|---|---|
| 4,723,818 A * | 2/1988 | Beisch et al. ............ 301/37.21 |
| 5,452,608 A | 9/1995 | Green | |
| 5,844,131 A * | 12/1998 | Gabelmann et al. ........ 73/146.8 |
| 6,163,255 A | 12/2000 | Banzhof et al. | |
| 6,568,259 B2 | 5/2003 | Saheki et al. | |
| 6,722,409 B1 | 4/2004 | Martin | |
| 6,799,455 B1 | 10/2004 | Neefeldt et al. | |
| 6,805,000 B1 | 10/2004 | Sheikh-Bahaie | |
| 6,885,191 B1 | 4/2005 | Gleman | |
| 6,904,796 B2 | 6/2005 | Pacsai et al. | |
| 6,912,897 B2 | 7/2005 | Luce | |
| 6,959,597 B2 | 11/2005 | Ito et al. | |
| 7,168,305 B2 | 1/2007 | Narayanaswamy | |
| 2005/0087007 A1 * | 4/2005 | Uleski ........................ 73/146 |

* cited by examiner

*Primary Examiner*—Jewel Thompson
(74) *Attorney, Agent, or Firm*—Tarolli, Sundheim, Covell & Tummino LLP

(57) ABSTRACT

A tire pressure monitoring apparatus includes a pressure transducer having a housing and a valve stem secured to the housing. The valve stem projects through an opening in a wheel for holding the tire. A retention clip is secured to the valve stem. The retention clip includes a plurality of spring retention members for engaging the opening in the when the valve stem projects through the opening. The retention members are deflected when the valve stem projects through the opening and have resilient properties that spring bias the retention members against the wheel to help retain the tire pressure monitoring apparatus on the wheel.

8 Claims, 8 Drawing Sheets

TIRE PRESSURE MONITORING APPARATUS

RELATED APPLICATION

This application claims priority from U.S. provisional patent application Ser. No. 60/734,664, filed on Nov. 8, 2005, the subject matter of which is incorporated herein by reference.

TECHNICAL FIELD

The present invention relates to a tire pressure monitoring apparatus and, in particular, relates to a unitized tire pressure monitoring apparatus with features that facilitate installation on various vehicle wheel configurations.

BACKGROUND OF THE INVENTION

Tire pressure monitoring ("TPM") systems are known in the art. There have been several mounting arrangements proposed for these TPM systems and apparatuses. Some of the proposed mounting arrangements are shown in U.S. Pat. Nos. 6,163,255, 6,722,409, 6,568,259, and 6,799,455.

The automotive industry is driving to reduce the number of part numbers used for vehicle assembly. The industry is also attempting to reduce labor in plants and cost from suppliers for purchased assemblies. TPM sensors are rapidly becoming a commodity, and OEMs are attempting to use one part for multiple platform applications with simplified assembly while maintaining current assembly processes. The challenge for the TPM sensor is providing a single TPM sensor configuration that is capable of being mounted rigidly to a wide range of wheel rim thicknesses and configurations, while maintaining the current "snap-in" valve design and continued sealing performance over high speeds.

SUMMARY OF THE INVENTION

In accordance with the present invention, a unitized tire pressure monitoring system facilitates installation on various vehicle wheel configurations.

In one aspect, the present invention relates to a tire pressure monitoring apparatus that includes a pressure transducer having a housing and a valve stem secured to the housing. The valve stem projects through an opening in a wheel for holding the tire. A retention clip is secured to the valve stem. The retention clip includes a plurality of spring retention members for engaging the opening in the when the valve stem projects through the opening. The retention members are deflected when the valve stem projects through the opening and have resilient properties that spring bias the retention members against the wheel to help retain the tire pressure monitoring apparatus on the wheel.

In another aspect, the present invention relates to a tire pressure monitoring apparatus that includes a pressure transducer having a housing.

A valve stem is connected with the housing and movable relative to the housing. The valve stem projects through an opening in a wheel for holding the tire and includes a central bore. A deformable sleeve secured in the central bore. A pin is disposed in the sleeve and movable axially relative to the sleeve. The pin is movable in the sleeve to a position that deforms a portion of the sleeve. The sleeve, when deformed, blocks relative movement between the pressure transducer and the valve stem.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF PREFERRED EMBODIMENT

Figure 1:
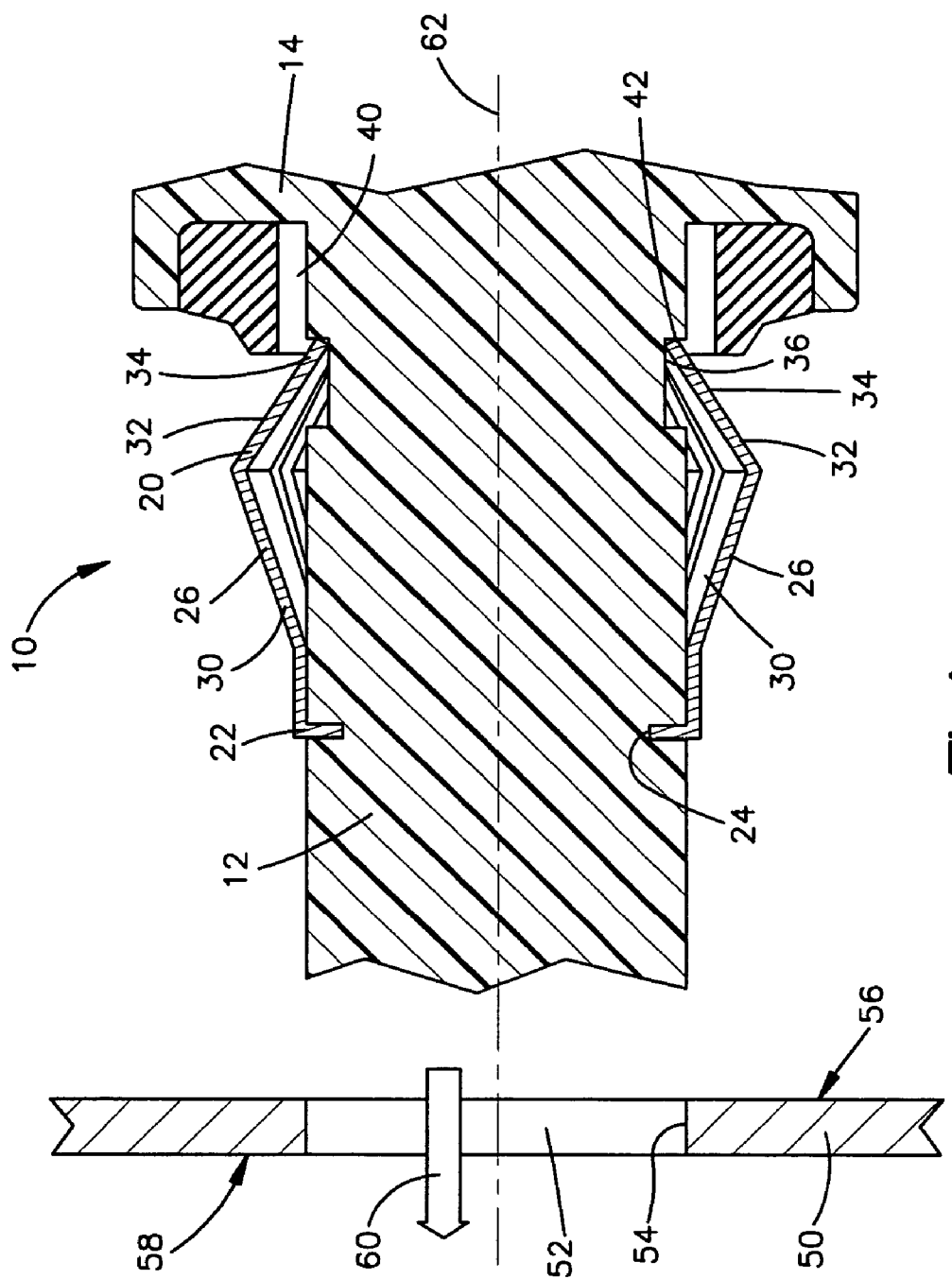
FIG. 1 is a sectional view of a portion of a tire pressure monitoring apparatus in accordance with a first embodiment of the present invention.
Figure 2:
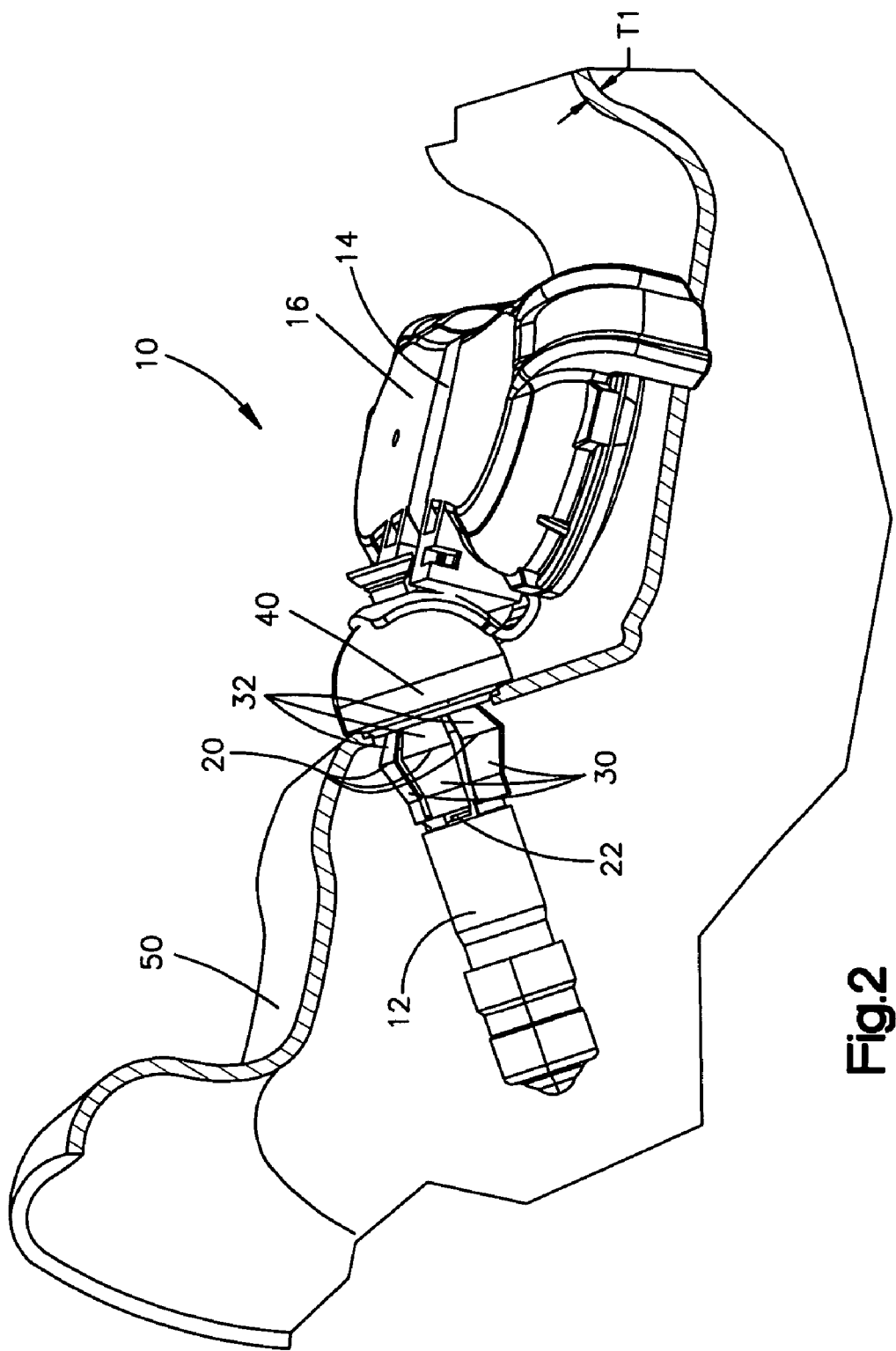
FIG. 2 is a perspective view illustrating a first mounting arrangement of the tire pressure monitoring apparatus of FIG. 1.
Figure 3:
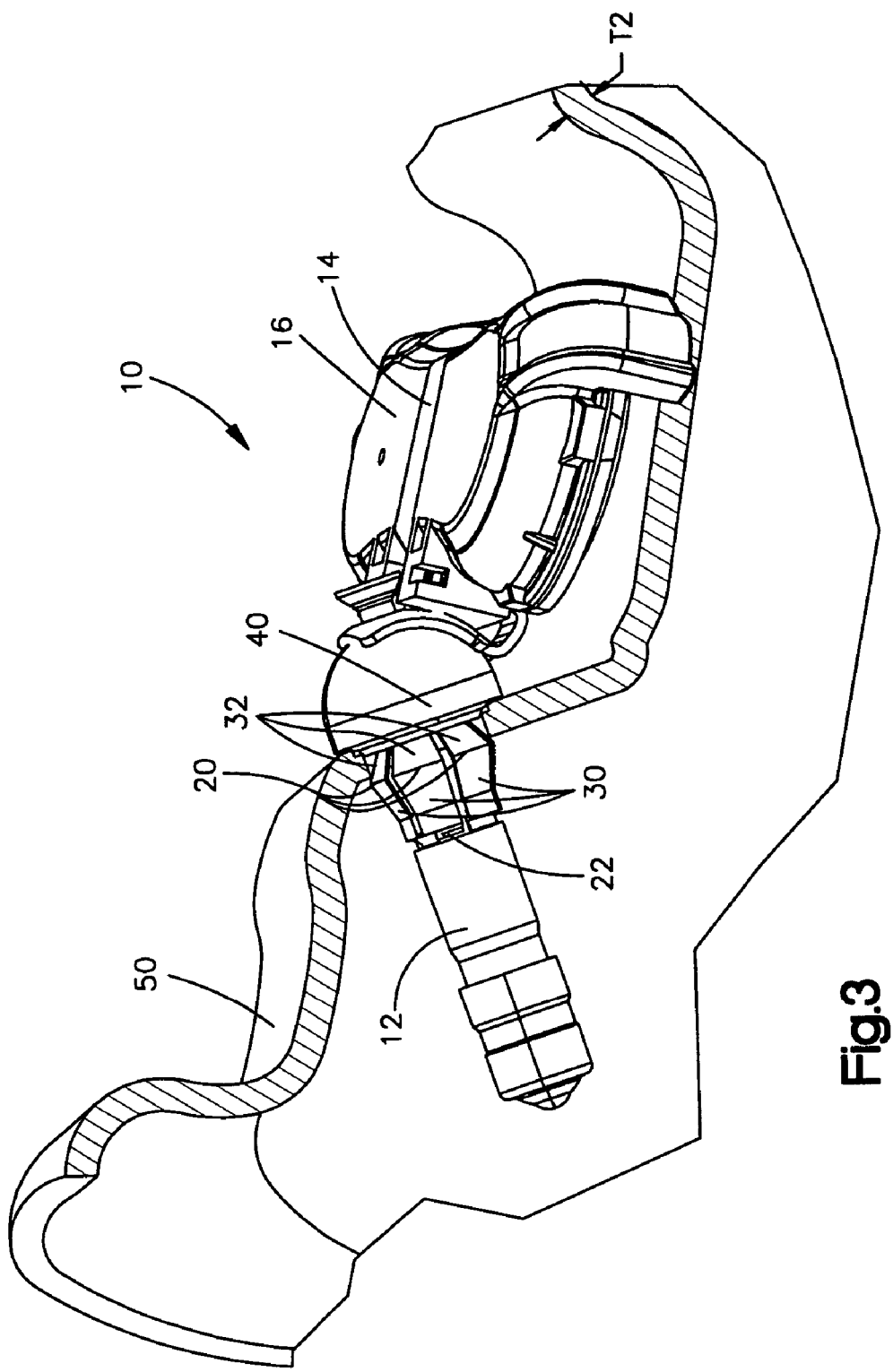
FIG. 3 is a perspective view illustrating a second mounting arrangement of the tire pressure monitoring apparatus of FIG. 1.
Figure 4:
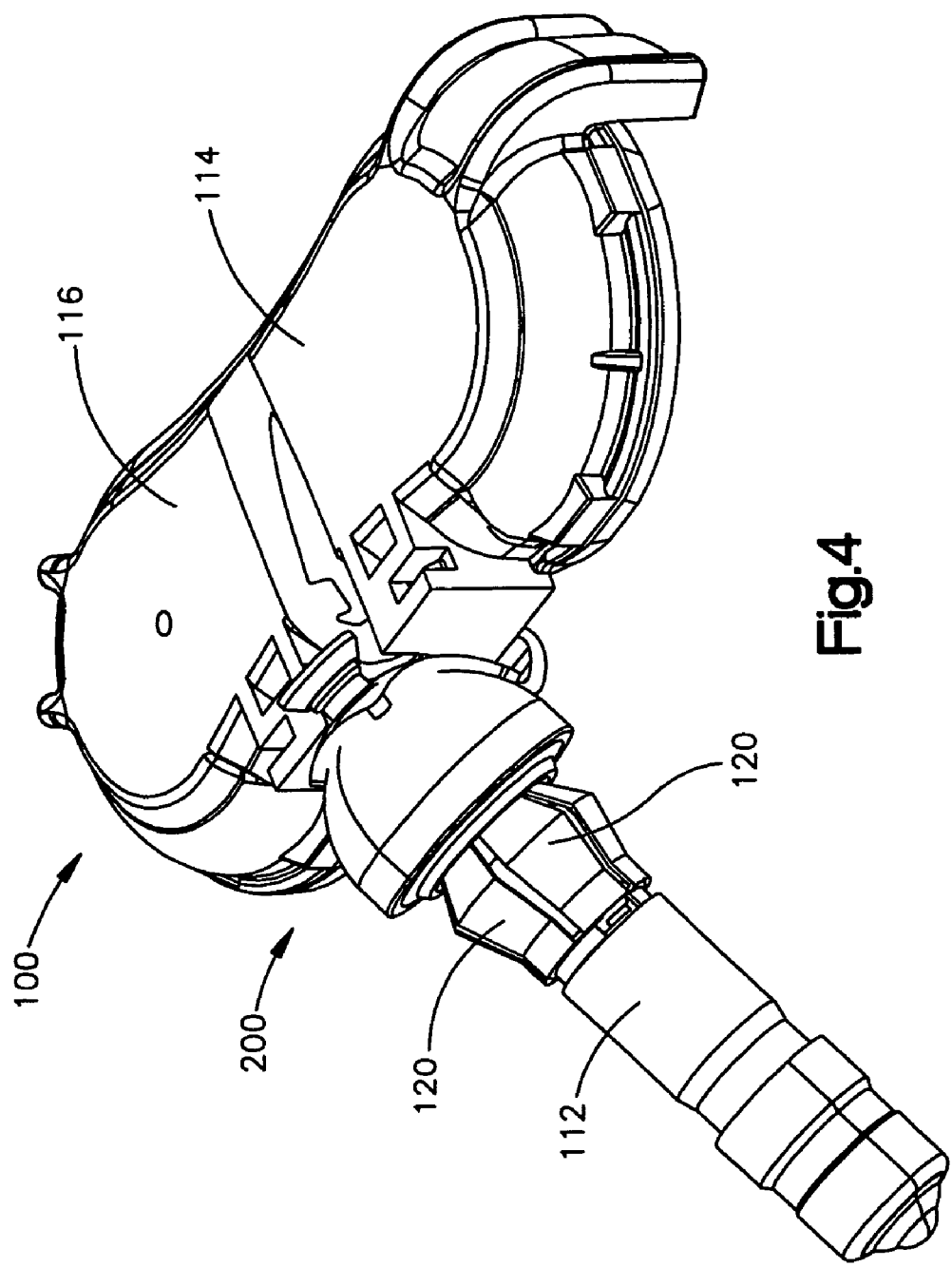
FIG. 4 is a perspective view of a tire pressure monitoring apparatus in accordance with a second embodiment of the present invention.

Referring to FIGS. 1-3, according to a first embodiment of the present invention, a tire pressure monitoring ("TPM") apparatus or sensor 10 includes a valve stem 12 and a pressure transducer 14 with a housing 16. The TPM sensor 10 is configured to be mounted on a vehicle wheel 50 in a manner described in further detail below. The valve stem 12 includes a valve mechanism (not shown) that allows for selectively inflating or deflating a tire (not shown) mounted on the wheel 50, as known in the art. The pressure transducer 14 is operative to sense the inflation pressure of the tire and provide a signal, indicative of the sensed pressure, to a vehicle mounted apparatus (not shown), such as a controller.

According to the first embodiment of the present invention, the TPM sensor 10 includes a tolerance absorbing retention clip 20. The retention clip 20 is mounted on or near the valve stem 12 proximate the pressure transducer 14. The retention clip 20 includes a ring portion 22 that extends circumferentially around the valve stem 12. As shown in FIG. 1, the ring portion 22 may extend into an annular groove 24 in the valve stem 12 and thus help fix or secure the retention clip 20 on the valve stem.

The retention clip 20 also includes a plurality of retention members 26 that extend axially along the valve stem 12. As shown in FIG. 1, the retention members 26 are bent or otherwise deformed to form first and second retention arms 30 and 32. The retention arms 30 and 32 have a generally V-shaped configuration and are arranged to face concavely toward the valve stem 12. The retention clip 20 is formed of a flexible resilient material, such as metal (e.g., steel, spring steel). The retention arms 30 and 32, when deflected, exhibit a spring bias that tends to return the arms to the position shown in FIG.

1. Terminal end portions 34 of the second retention arms 32 of the retention members 26 extends into an annular groove 36 in the valve stem 12.

The valve stem 12 also includes a seal 40, such as an O-ring or grommet, positioned adjacent or near the retention clip 20. The seal 40 may be constructed of any material, such as a rubber, plastic, or elastomeric material, that is suited to form a gas-tight seal. As shown in FIG. 1, the seal 40 is positioned adjacent the annular groove 36 and may have a portion 42 that extends into the annular groove to help retain the seal mounted on the valve stem 12.

The TPM sensor 10 configuration illustrated in FIGS. 1-3 and described above is a "snap-in" design capable of being mounted rigidly to a wide range of wheel rim thicknesses and configurations while providing sealing performance over high speeds. Referring to FIG. 2, the wheel 50 has a relatively thin wall thickness, indicated generally at T1. The relatively thin wall thickness T1 may be encountered, for example in the case of a steel construction of the wheel 50. As an example, the wheel thickness T1 may be about 1.5 millimeters. Referring to FIG. 3, the wheel 50 has a relatively thick wall thickness, indicated generally at T2. The relatively thick wall thickness T2 may be encountered, for example in the case of a cast aluminum construction of the wheel 50. As an example, the wheel thickness T2 may be about 6.0 millimeters.

The wheel 50 includes an opening 52 in which the TPM sensor 10 is mounted. The valve stem is inserted and drawn, pulled, or otherwise forced through the opening 52 in the direction indicated generally at 60 in FIG. 1 to the positions shown in FIGS. 2 and 3. As the valve stem 12 of the TPM sensor 10 is drawn through the opening 52 in the direction 60, the first retention arms 30 of the retention members 26 engage the wheel 50 at the intersection of the side wall 54 of the opening 52 and the inner surface 56 of the wheel. As the valve stem 12 is further drawn in the direction 60, the engagement of the first retention arms 30 with the wheel 50 causes the retention members to deflect inward toward the axis 62, thus permitting insertion of the valve stem 12 through the opening 52. The annular groove 36 into which the terminal end portions 34 of the retention members 26 extend provide a clearance for allowing movement of the retention members relative to the valve stem 12 as the retention members deflect.

Once the first retention arms 30 pass through the opening 52, the retention members 26 are urged away from the axis 62 under their own inherent resilience toward their non-deflected positions of FIG. 1. As this occurs, the second retention arms 32 engage and are biased against the sidewall 54 at the intersection of the sidewall and an outer surface 58 of the wheel 50. This transition form the first retention arms 30 to the second retention arms 32 may produce a "snap" feel or sound that provides tactile feedback to the installer that the TPM sensor 10 is properly installed. The biasing of the second retention arms 32 against the sidewall 54 coupled with the angle at which the second retention arms engage the sidewall creates an axial component force that urges the TPM sensor in the direction 60 along the axis 62. This component force urges the seal 40 against the inner surface 56 of the wheel 50, thus forming a seal for maintaining tire inflation pressure.

Referring to FIG. 2, in the case of the relatively thin wall construction of the wheel 50, the portions of the second retention arms 32 that engage the sidewall of the opening 52 are adjacent or near the terminal end portions 34 of the retention members. Referring to FIG. 3, in the case of the relatively thick wall construction of the wheel 50, the portions of the second retention arms 32 that engage the sidewall of the opening 52 are adjacent or near their respective intersections with the first retention arms 30.

Referring to FIGS. 4-7, according to a second embodiment of the present invention, a tire pressure monitoring ("TPM") apparatus or sensor 100 includes a valve stem 112 and a pressure transducer 114. The TPM sensor 100 is configured to be mounted on a vehicle wheel 150 (see FIG. 5) in a manner described in further detail below. The valve stem 112 includes a valve mechanism (not shown) that allows for selectively inflating or deflating a tire (not shown) mounted on the wheel 150, as known in the art. The pressure transducer 114 is operative to sense the inflation pressure of the tire and provide a signal, indicative of the sensed pressure, to a vehicle mounted device (not shown), such as a controller.

The TPM sensor 100 may be mounted to the wheel 150 in any suitable manner. For example, as shown in FIGS. 4-7, the TPM sensor 150 may include a retention clip 120, similar or identical to that described above with regard to the first embodiment of FIGS. 1-3. The TPM sensor 100 may thus have a "snap-in" design capable of being mounted rigidly to a wide range of wheel rim thicknesses and configurations while providing sealing performance over high speeds. Alternatively, the TPM sensor 100 may include known means (not shown), such as a threaded fastening device for securing the sensor on the wheel 150.

According to the second embodiment of the present invention, the TPM sensor 100 includes a position adjusting mechanism 200 for adjusting the position of the valve stem 112 relative to the pressure transducer 114. This allows for configuring the TPM sensor 100 for installation on wheels 150 having different configurations. In the embodiment illustrated in FIGS. 4-7, the TPM sensor 100 has two different positions to which the valve stem 112 may be adjusted relative to the pressure transducer 114. From the description provided herein, however, those skilled in the art will appreciate that the TPM sensor 100 could be configured to have more than two positions to which the valve stem 112 may be adjusted relative to the pressure transducer 114.

Figure 5:
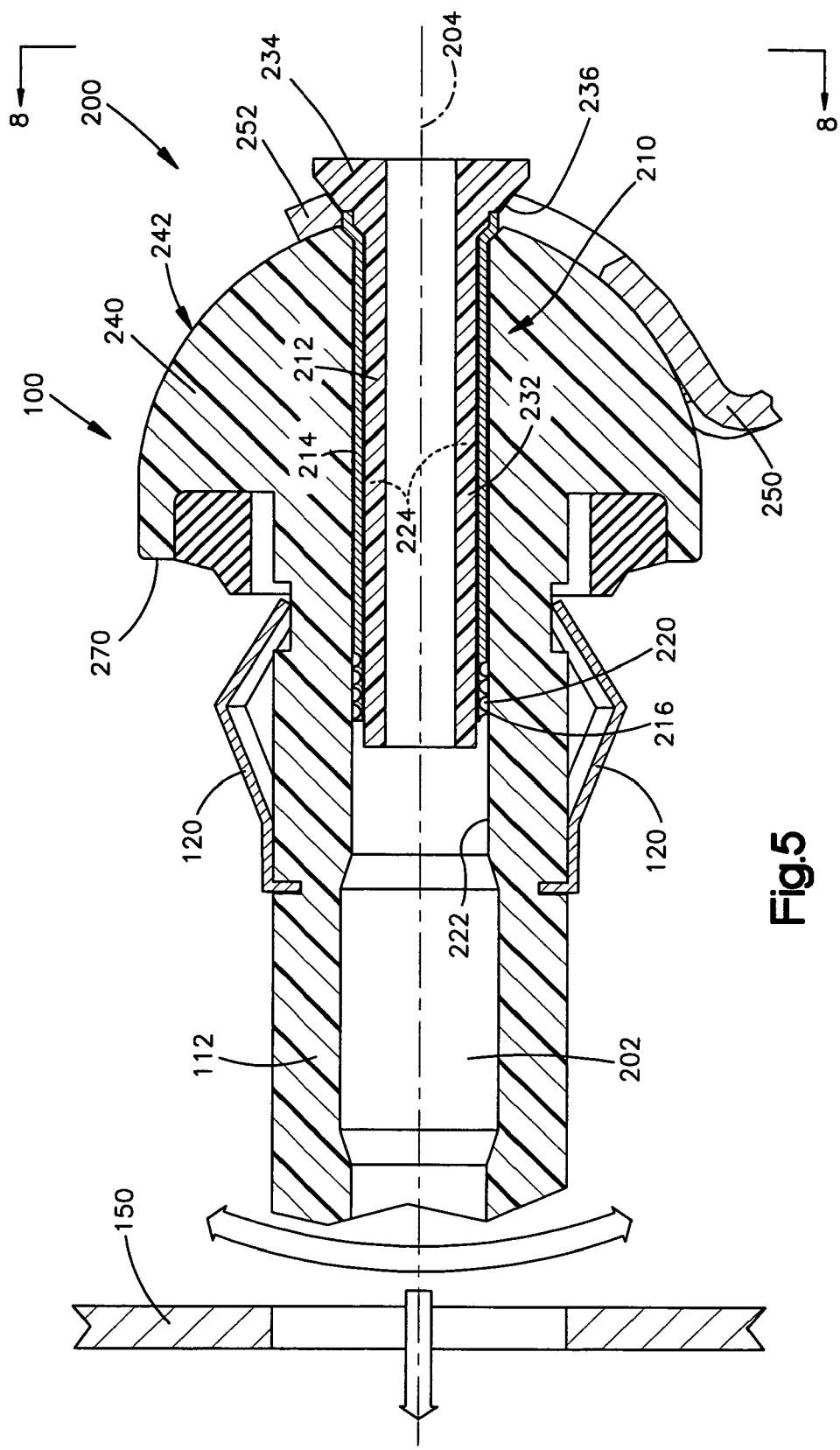
FIG. 5 is a sectional view of a portion of the tire pressure monitoring apparatus of FIG. 4.

Referring to FIG. 5, the valve stem 112 includes a longitudinal central bore 202 that extends along an axis 204 of the valve stem. A pin assembly 210 includes a push pin 212 supported in a retainer sleeve 214. The pin assembly 210 is receivable in the central bore 204 of the valve stem 112. The retainer sleeve 214 includes an outer threaded portion 216 that screws into a threaded portion 220 on an inner surface 222 of the central bore 204 to secure the pin assembly 210 to the valve stem 112. The push pin 212 and retainer sleeve 214 may include longitudinal ribs 224 that mate with and engage each other to help prevent relative rotational movement between the pin and retainer sleeve. The push pin 212 and retainer sleeve 214 may, however, move axially relative to each other.

The push pin 212 includes a central longitudinal bore 230 that is placed in fluid communication with the central bore 202 of the valve stem 112 when the TPM sensor 100 is in the assembled condition of FIG. 5. The central bores 202 and 230 thus provide a conduit or path through which inflation fluid may be directed to inflate or deflate a tire (not shown) mounted on the wheel 150. The push pin 212 includes a shaft portion 232 and a head portion 234 having a generally frusto-conical configuration with a sidewall 236 that tapers outward and away from the axis 204. The head portion 234 thus has a diameter that is enlarged over that of the shaft portion 232.

The valve stem 112 includes an end portion 240 into which the pin assembly 210 is inserted in the central bore 202. The end portion 240 has a generally curved, semi-spherical outer surface 242. The pressure transducer 114 includes a valve stem support flange 250 that extends from the transducer housing 116 and includes a receiving portion 252. The receiving portion 252 has a generally curved, semi-spherical surface 254 that engages and mates with the surface 242 of the end portion 240. The end portion 240 and the receiving portion 252, in some respects, have a configuration similar to a ball joint for allowing relative pivotal movement between the valve stem 112 and the pressure transducer 114. This relative pivotal movement between the valve stem 112 and the pressure transducer 114 is indicated generally by the curved arrow in FIG. 5.

Figure 6:
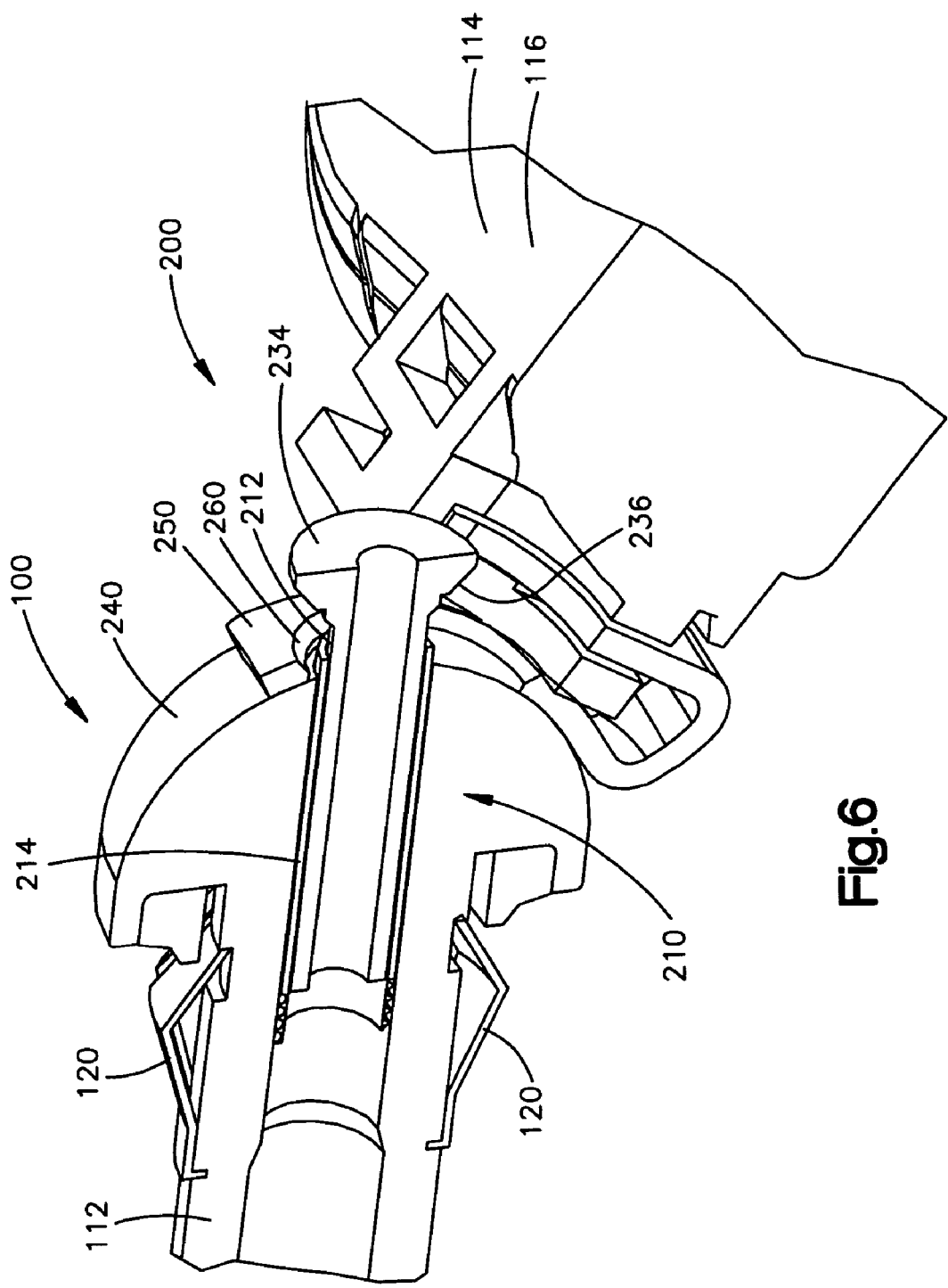
FIG. 6 is a perspective view, partially in section, illustrating a first condition of a portion of the tire pressure monitoring apparatus of FIG. 4.
Figure 7:
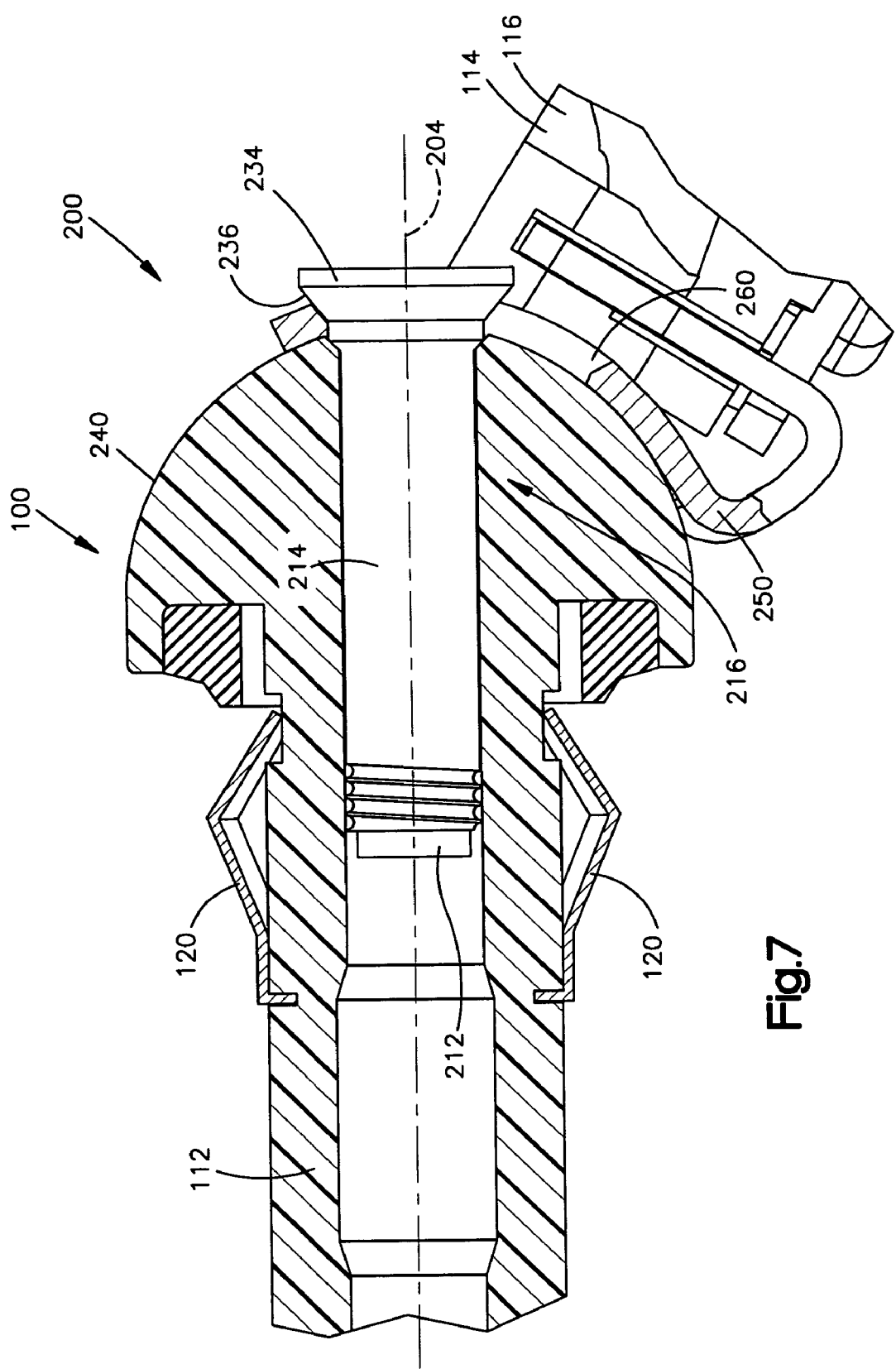
FIG. 7 is a perspective view, partially in section, illustrating a second condition of the portion of the tire pressure monitoring apparatus of FIG. 4.

The retainer sleeve 214 of the pin assembly 210 has a generally cylindrical configuration prior to selecting the desired relative positions of the valve stem 112 and the pressure transducer 114. This is shown in FIG. 6. As shown in FIG. 6, prior to selecting the relative positions of the valve stem 112 and pressure transducer 114, the push pin 212 is in a retracted position with the head portion 234 positioned axially away from the end of the cylindrical retainer sleeve 214.

Figure 8:
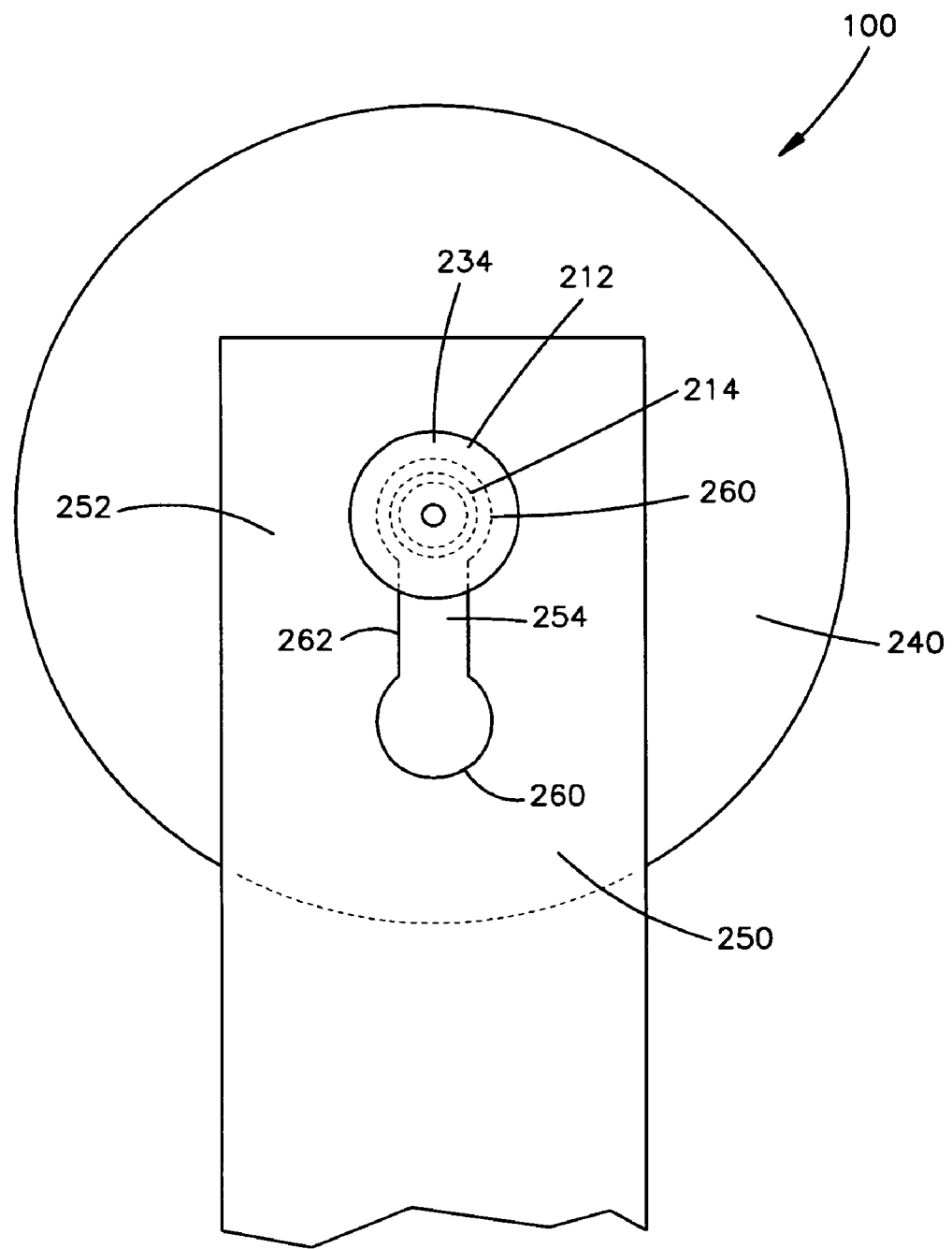
FIG. 8 is an end view of a portion of the tire pressure monitoring apparatus taken generally along line 8-8 in FIG. 5.

Referring to FIG. 8, the receiving portion 252 of the support flange 250 includes an aperture 254 for receiving the head portion 234 of the push pin 212 of the pin assembly 210. The aperture 254 is configured to have two generally circular or cylindrical end portions 260 connected by a narrow passage portion 262. The passage portion 262 is sized so as to allow the retainer sleeve 214 of the pin assembly 210 to move between the end portions 260 as the valve stem 112 and pressure transducer 114 pivot relative to each other. The end portions 260 are sized to have a diameter larger than the outside diameter of the retainer sleeve 214 and smaller than the outer diameter of the head portion 234 of the push pin 212.

To assemble the TPM sensor 100, the end portion 240 of the valve stem 112 is positioned against the receiving portion 252 of the support flange 250. The pin assembly 210 is inserted through the aperture 254 and secured in the central bore 202 of the valve stem 112 by the threads 216 and 220. This connects the valve stem 112 to the pressure transducer 114. In this connected condition, however, the valve stem 112 and pressure transducer 114 may move or pivot relative to each other.

The end portions 260 of the aperture 254 define the two possible relative positions of the valve stem 112 and pressure transducer 114. The relative position between the valve stem 112 and the pressure transducer 114 is chosen by placing the head portion 234 of the push pin 212 in the end portion 260 associated with the desired relative position. The desired position of the valve stem 112 relative to the pressure transducer 114 depends on the particular configuration of the wheel 150 onto which the TPM sensor 100 is to be installed. When the valve stem 112 and pressure transducer 114 are in the desired position relative to each other, a force is placed on the head portion 234 to urge the push pin 212 into the retainer sleeve 214. This force may be applied manually, via a tool, or a combination manually and via a tool.

When the head portion 234 is urged into the retainer sleeve 214, the frusto-conical surface 236 deforms the retainer sleeve outward and away from the axis 204 against the end portion 260 of the aperture 254 and against the inner surface 222 of the central bore 202. The end portion 260 may be counterbored to receive and mate with the surface 236 of the head portion 234. The retainer sleeve 214, having an enlarged diameter end portion, can no longer travel through the passage portion 262 and is thus maintained in the selected end portion 260. The head portion 234 and deformed portion of the retainer sleeve 214 also may exert a clamping force that further secures the relative positions of the valve stem 112 and pressure transducer 114.

In one example, when the valve stem 112 and pressure transducer 114 are in the desired position relative to each other, a force is placed on the head portion 234 manually to urge the push pin 212 into the retainer sleeve 214. This manual force may be sufficient only to partially deform the retainer sleeve 214, but enough to initially lock the valve stem 112 and pressure transducer 114 in the desired relative positions. Thereafter, the TPM sensor 100 may be fit onto the wheel 150 and a tool or machine may be used to further urge the push pin 212 into the retainer sleeve 214 to fully deform the retainer sleeve and lock the valve stem 112 and pressure transducer 114 in the desired relative positions. This operation may simultaneously fix the TPM sensor 100 to the wheel 150, for example, via the retainer clip 120, as described above in regard to the first embodiment. The end portion 240 of the valve stem 112 has a circumferential edge portion 270 that fits into a cavity when installed on the wheel 150. The valve stem 112 may thus act as a hard stop to prevent over compression during the assembly process.

From the above description of the invention, those skilled in the art will perceive improvements, changes and modifications. For example, the configuration of the second embodiment can be implemented with clamp-in valve stem assemblies (not shown) that utilize nuts or other fasteners on the outside of the wheel. In this configuration, the circumferential edge portion of end portion of the valve stem may act as a hard stop while the fastener is torqued onto the valve stem. The push-pin position adjusting configuration of the second embodiment can also be used with a rubber valve stem, in which case, the push pin could have an additional displacement feature to expand the rubber valve in the wheel hole to enhance the retention of the valve stem to the wheel. Such improvements, changes and modifications within the skill of the art are intended to be covered by the appended claims.

Having described the invention, the following is claimed:

1. A tire pressure monitoring apparatus comprising:
   a pressure transducer having a housing;
   a valve stem secured to the housing, the valve stem being for projecting through an opening in a wheel for holding a tire; and
   a retention clip secured to the valve stem, the retention clip comprising a plurality of spring retention members for engaging the wheel when the valve stem projects through the opening, the retention members being deflected when the valve stem projects through the opening and having resilient properties that spring bias the retention members against the wheel to help retain the tire pressure monitoring apparatus on the wheel.

2. A tire pressure monitoring apparatus comprising:
   a pressure transducer having a housing;
   a valve stem secured to the housing, the valve stem being for projecting through an opening in a wheel for holding a tire; and
   a retention clip secured to the valve stem, the retention clip comprising a plurality of spring retention members for engaging the wheel when the valve stem projects through the opening, the retention members being deflected when the valve stem projects through the opening and having resilient properties that spring bias the retention members against the wheel to help retain the tire pressure monitoring apparatus on the wheel, wherein the retention members have a generally inverted V-shaped configuration, the retention members comprising:
   a first portion that engages the wheel when the valve stem is initially inserted in the opening, the engagement between the wheel and the first portion deflecting the retention member inward toward a longitudinal axis of the valve stem to allow the valve stem to project through the opening; and a second portion that engages the wheel once the first portion passes through the opening, the spring bias of the retention member urging the second portion against the wheel which creates a component force that urges the valve stem against the wheel to retain the tire pressure monitoring apparatus on the wheel.

3. The tire pressure monitoring apparatus recited in claim 2, further comprising a seal member, the retention members urging the seal member against the wheel to form an air-tight seal.

4. The tire pressure monitoring apparatus recited in claim 1, wherein the valve stem is movable relative to the housing and comprises a central bore, the tire pressure monitoring apparatus further comprising:

a deformable sleeve secured in the central bore; and a pin disposed in the sleeve and movable axially relative to the sleeve, the pin being movable in the sleeve to a position that deforms a portion of the sleeve, the sleeve when deformed blocking relative movement between the pressure transducer and the valve stem.

5. A tire pressure monitoring apparatus comprising:

a pressure transducer having a housing;

a valve stem connected with the housing and movable relative to the housing, the valve stem being for projecting through an opening in a wheel for holding a tire, the valve stem comprising a central bore;

a deformable sleeve secured in the central bore; and a pin disposed in the sleeve and movable axially relative to the sleeve, the pin being movable in the sleeve to a position that deforms a portion of the sleeve, the sleeve when deformed blocking relative movement between the pressure transducer and the valve stem.

6. The tire pressure monitoring apparatus recited in claim 5, wherein the pin comprises a frusto-conical head portion, the head portion deforming the sleeve radially outward when urged into the sleeve to block relative movement between the pressure transducer and the valve stem.

7. The tire pressure monitoring apparatus recited in claim 6, wherein the valve stem comprises an end portion that mates with a support flange of the housing, the sleeve and pin being insertable into the central bore through the end portion of the valve stem, the support flange comprising an aperture through which the head portion of the pin extends and against which the sleeve is deformed by the head portion to block relative movement between the pressure transducer and the valve stem.

8. The tire pressure monitoring apparatus recited in claim 5, further comprising a retention clip secured to the valve stem, the retention clip comprising a plurality of spring retention members for engaging the wheel when the valve stem projects through the opening, the retention members being deflected when the valve stem projects through the opening and having resilient properties that spring bias the retention members against the wheel to help retain the tire pressure monitoring apparatus on the wheel.

* * * * *